3,197,416
PROCESS OF REMOVING METALLIC CONTAMINANTS FROM HYDROCARBON CRACKING CATALYSTS
Richard I. Bergman, Princeton, N.J., and Norman W. Frisch, Levittown, Pa., assignors to Princeton Chemical Research, Inc., Princeton, N.J., a corporation of New Jersey
No Drawing. Filed Mar. 15, 1963, Ser. No. 265,368
6 Claims. (Cl. 252—411)

This invention relates to a process for removing metallic contaminants from hydrocarbon cracking catalysts, and more particularly to such a process which facilitates repeated use of silica-containing cracking catalysts to produce high yields of desired liquid hydrocarbon products.

Petroleum feed stocks to catalytic cracking processes contain impurities of various heavy metals, e.g., iron, nickel or vanadium, in the form of metal salts and, more importantly, as metallo-organic complexes. These metallic contaminants are adsorbed on or react with the cracking catalyst, thereby altering its characteristics. Such metallic contaminants accumulate on the catalyst during sequential cracking cycles and promote the undesirable conversion of the hydrocarbon charge to coke, hydrogen and the various $C_1$–$C_3$ hydrocarbon gases. It has in fact been found that a metals-contaminated catalyst yields about 1.5 to 3 times as much coke and deleterious gaseous products as an uncontaminated catalyst. Consequently, the use of cracking catalysts contaminated with metallic impurities decreases the yield of the desired liquid hydrocarbon products produced by the cracking operation.

Various procedures have been devised to minimize or reduce the amount of metallic contaminants present on cracking catalysts during hydrocarbon cracking operations. Hence, since feed stocks having boiling points higher than about 1000° F. contain higher percentages of metallo-organic contaminants than lower boiling fractions, the higher boiling fractions have been partially or totally excluded from the feed stock to minimize contaminant proportions. Such procedure, however, eliminates higher molecular weight feed fractions whose use may be desirable in the interest of optimum refinery economics.

It is also known to reduce the amount of metallic contaminants by replacing the used contaminated catalyst with fresh catalyst containing a lesser quantity of metallic contaminants. This procedure is costly.

It has recently been suggested, in U.S. Patent No. 3,041,270 of June 26, 1962, to remove metallic contaminants from used silica-alumina hydrocarbon cracking catalysts by contacting such catalysts with a cationic ion exchange resin in an aqueous medium at a pH of below 4.5. While such a procedure effects removal of at least a portion of the metallic contaminants from the hydrocarbon cracking catalyst, use of the cationic resins in the strongly acid media required therefor has been found to attack and degrade the silica-alumina catalyst treated.

It is accordingly among the objects of the present invention to provide a process for removing metallic contaminants from a hydrocarbon cracking catalyst without impairing the catalytic or structural properties of the cracking catalyst.

Another object of this invention is to provide a process for removing metallic contaminants in an amount sufficient to provide substantially improved product distribution from cracking operations utilizing the resulting purified cracking catalyst.

These and other objects and advantages of the invention will be apparent from a consideration of the following detailed description.

In accordance with the present invention it has been discovered that metallic contaminants may be effectively removed from a hydrocarbon cracking catalyst by intimately contacting the catalyst with a mixture of anionic and cationic ion exchange resins constituted of from about 2% to 85% by weight of the anionic resin, and the balance essentially the cationic resin.

Use of the mixture of anionic and cationic ion exchange resins effects markedly greater removal of the metallic contaminants from the cracking catalyst than achieved, for example, employing a cationic resin alone. Moreover, the mixture of anionic and cationic resins unexpectedly provides such superior contaminant removal in a medium having a pH within the range of from about 4 to 10, desirably from about 4 to 7, without producing substantial degradation of the silica-containing cracking catalyst treated. Hence a process is thereby provided for removing substantial proportions of metallic contaminants from a cracking catalyst without concomitantly attacking the catalyst itself.

The hydrocarbon cracking catalysts treated in accordance with the present invention are silica-containing catalysts, e.g., silica-alumina catalysts which may contain from about 5 to 50 weight percent, desirably about 10–25 weight percent, $Al_2O_3$, and silica-magnesia catalysts, which may contain from about 5 to 50 weight percent MgO.

The ion exchange resins employed herein are polymeric, cross-linked, water-insoluble resins having anion or cation exchange groups linked to the polymeric structure. Such resinous materials are commercially available in the form of beads, granules, micro-powders, films or fibers.

The anionic ion exchange resins may be of strong, intermediate or weak basicity. The strong anionic resins preferably comprise quaternary ammonium salts of styrene-divinylbenzene copolymers which may be prepared, for example, by chloromethylating the appropriate styrene-divinylbenzene copolymers and thereafter aminating the product with a tertiary amine such as trimethylamine. Such materials are commercially available as, for example, Dowex 2, 11 or 21K; Amberlite 400, 401, 402, or 410; and Duolite A40, A42, A101, or A102. The intermediate or weakly basic anionic ion exchange resins include styrene-divinyl benzene or cross-linked acrylic polymer nuclei substituted by mixtures of primary, secondary and tertiary amine groups. Commercially available intermediate resins include Amberlite XE 168 and Duolite A30. Weak anionic resins are marketed under the designations Dowex 3, Amberlite IR4B, XE90 and Duolite A2 and A7.

Activation of the strongly basic anionic resins is effected by contacting the same with strong bases such as aqueous sodium hydroxide or potassium hydroxide, while the intermediate or weakly basic anionic resins may be activated with aqua ammonia.

Preferably, the strongly acidic cationic ion exchange resins utilized in the present invention are sulfonated styrene-divinylbenzene copolymers. Such resins are commercially distributed under the tradenames Dowex-50, Permutit Q, Duolite C–20, and Amberlite IR–120. Cationic resins of intermediate and weak acidity are prepared by sulfonating an expanded phenolic matrix (e.g., Duolite C–10), by introducing phosphonic acid groups on a hydrocarbon matrix (e.g., Duolite C–63), or by substituting carboxylic acid groups on a cross-linked acrylic resin (e.g. Duolite CS–101).

The cationic resins are activated by contact with suitable acidic materials, such as aqueous solutions of hydrochloric acid, sulfuric acid or nitric acid or hydrogen chloride dispersed in an ethanol-benzene mixture. The condensed vapors of a constant boiling acid mixture can also be used.

As indicated above, the anionic and cationic ion exchange resins are admixed in an amount of from about 2% to 85%, preferably from about 5% to 50%, by weight of the anionic resin, with correspondingly from about 98% to 15%, preferably from about 95% to 50% by weight of the cationic resin. The resulting mixture may be intimately contacted in the absence of solvents with the contaminated cracking catalyst after it is withdrawn from the cracking process and cooled, in a fluidized bed or otherwise agitated reaction zone. It is, however, preferred to contact the catalyst and the ion exchange resin mixture in the presence of a polar solvent, preferably water or mixtures of water with ethanol or the like, at temepratures of from 0° to 100° C. and under atmospheric or slightly elevated pressures up to, for example, about 5 atmospheres. The reaction medium, which may contain minor proportions of a non-polar solvent, e.g., benzene or xylene, is maintained at a pH of from about 4 to 10, at which condition metallic contaminant removal is effected without catalyst degradation.

The solvent, cracking catalyst and ion exchange resin mixture is retained in intimate contact for a period of from 10 minutes to 84 hours, preferably from 1 to 72 hours. The mixture may, if desired, be agitated during a portion of or throughout the contact period. After contacting the cracking catalyst with the ion exchange resin mixture the catalyst is separated, as by filtration or elutriation, washed if desired, dried and recycled to the cracking process for further catalysis.

The anionic and cationic ion exchange resins may thereafter be physically separated from one another by filtration or elutriation, by virtue of the greater particle sizes and densities of cationic exchange resins as compared with the anionic resins. The thus separated resins are conventionally regenerated by activation, in the manner described above, by contact with alkaline or acidic materials, respectively. Such regeneration may be conveniently performed in either a packed bed or agitated reaction vessel.

When its is desired to recover the metal values extracted by the ion exchange resins, the metals may be precipitated from the regenerant solutions, as by concentrating such solutions by distillation. Alternatively, the ion exchange resins can be regenerated at varying pH levels to permit selective recovery of the various metals. Such selective removal may also be achieved by washing each ion exchange resin with a solvent or chelating agent which has a greater affinity for the metal than does the ion exchange resin.

It will be understood that the hereinabove described procedures for separating the individual anionic and cationic ion exchange resins and removing the exchanged metal values therefrom are not essential to the practice of the present invention, and when performed may utilize any suitable conventional techniques.

In a particularly preferred embodiment of the invention the hydrocarbon cracking catalyst is initially treated with a reducing agent and/or a chelating agent to place the metallic contaminants formed on the catalyst in more suitable form for effective removal by the mixture of ion exchange resins. The use of a sodium hydrosulfite reducing agent and either an ethylenediaminetetraacetic acid or sodium tripolyphosphate chelating agent, preferably in admixture, with the sodium hydrosulfite in an amount of from about 5 to 95 weight percent of the mixture and the balance essentially one of the specified chelating agents, has been found particularly desirable for the initial treatment of a silica-alumina cracking catalyst.

After treating the silica-containing cracking catalyst with the reducing agent and/or chelating agent the catalyst is separated, washed and thereafter intimately contacted in accordance with the invention with the specified mixture of anionic and cationic ion exchange resins, which mixture may, if desired, include a minor portion of a chelating agent, such as those indicated hereinabove.

While the mechanisms by which the reducing agent and the chelating agent act upon the metallic contaminants on the curing catalyst is not fully understood, in part due to the unknown form or forms in which the metallic contaminants are adsorbed on the cracking catalyst, it is believed that such materials act to sequester the metallic contaminants in ionized forms. It will, however, be understood that the invention is not limited by this proposed theory of operation.

The following examples are illustrative of the treatment of hydrocarbon cracking catalysts in accordance with the process of the present invention which, it will be understood, is not limited to these examples. In the examples, all parts and percentages are given on a weight basis.

EXAMPLE 1

Ten grams of a metals-contaminated silica-alumina cracking catalyst (composed of approximately 13% alumina and 87% silica) were mixed with six grams of activated Dowex 50x8 cationic exchange resin and nine grams of activated Dowex 21K anionic ion exchange resin in 50 ml. distilled water. The mixture was agitated at room temperature for 8 hours, and then allowed to stand for 62 hours.

For comparison purposes an additional 10 grams of the contaminated catalyst were mixed in 50 ml. of water with solely the above cationic exchange resin, and the procedure described above was repeated.

The metals content of the untreated catalyst, the catalyst treated with the cationic ion exchange resin alone and the catalyst treated with the anionic and cationic resins in accordance with the present invention, is indicated in Table I below:

Table I

| Metallic Contaminant | Untreated Catalyst, Percent | Cationic Resin Treated Catalyst, Percent | Anionic-Cationic Resin Treated Catalyst, Percent |
|---|---|---|---|
| Nickel | 0.06 | 0.04 | 0.03 |
| Vanadium | 0.028 | 0.024 | 0.018 |
| Iron | 0.156 | 0.152 | 0.140 |

It is evident from the data appearing in Table I that use of the mixture of anionic and cationic exchange resins produced markedly improved metals removal as compared with use of the cationic exchange resin alone.

EXAMPLE 2

About 10 grams of a metals-contaminated silica-alumina cracking catalyst (approximately 13% alumina and 87% silica) containing 0.037% nickel, 0.017% vanadium and 0.156% iron by analysis, were mixed with 6 grams of activated Dowex 50x8 cationic ion exchange resin and 9 grams of activated Dowex 21K anionic ion exchange resin in 50 ml. distilled water. The materials were mixed at room temperature with agitation for a period of 6 hours. The treated catalyst was separated from the ion exchange resin mixture, washed and dried. The metals content by analysis of the catalyst before and after treatment is indicated in Table II below:

Table II

| Metallic Contaminant | Untreated Catalyst, Percent | Anionic-Cationic Resin Treated Catalyst, Percent |
|---|---|---|
| Nickel | 0.037 | 0.030 |
| Vanadium | 0.017 | 0.002 |
| Iron | 0.156 | 0.143 |

EXAMPLE 3

About 10 grams of the metals-contaminated cracking catalyst of Example 2 were treated with 100 ml. of a 2% sodium hydrosulfite solution and 100 ml. distilled water. The mixture was stirred vigorously for 10 minutes, and thereafter at intervals throughout a 4 hour period, while maintaining the temperature at about 70° F. The catalyst was separated by filtration and washed.

The thus pre-treated catalyst was then treated in the manner described in Example 2 above in admixture with 6 grams of activated Dowex 50x8 cationic exchange resin and 9 grams of activated Dowex 21K anionic exchange resin. The metals content of the catalyst before and after treatment is indicated in Table III below:

*Table III*

| Metallic Contaminant | Untreated Catalyst, Percent | Anionic-Cationic Resin Treated Catalyst, Percent |
|---|---|---|
| Nickel | 0.037 | 0.022 |
| Vanadium | 0.017 | 0.008 |
| Iron | 0.156 | 0.132 |

EXAMPLE 4

About 10 grams of the metals-contaminated cracking catalyst of Example 2 were mixed with 100 ml. of a 2% sodium hydrosulfite solution plus 100 ml. of a 2% ethylenediaminetetraacetic acid solution. The mixture was agitated, the catalyst separated by filtration, washed and then treated with a mixture of anionic and cationic exchange resins, in the manner described in Example 3. The metals content of the catalyst by analysis before and after the combined treatment is indicated in Table IV below:

*Table IV*

| Metallic Contaminant | Untreated Catalyst, Percent | Anionic-Cationic Resin Treated Catalyst, Percent |
|---|---|---|
| Nickel | 0.037 | 0.015 |
| Vanadium | 0.017 | 0.004 |
| Iron | 0.156 | 0.120 |

It will be noted that the present invention provides a process of removing metallic contaminants from a hydrocarbon cracking catalyst, which process can be readily carried out within a pH range, desirably from about pH 4 to 10, at which chemical attack of the conventional silica-containing cracking catalyst is minimized if not prevented, and which process nevertheless facilitates the production of high yields of desired liquid hydrocarbon products, employing the thus purified catalyst.

Since certain changes may be made in the above described process and different embodiments of the invention can be made without departing from the scope thereof, it is intended that all matter contained in the above description shall be interpreted as illustrative and not in a limiting sense.

The embodiments of the invention in which an exclusive privilege or property is claimed are defined as follows:

1. A process for removing metallic contaminants selected from the group consisting of iron, nickel and vanadium cations, from a silica-containing cracking catalyst selected from the group consisting of silica-alumina and silica-magnesia catalysts, which comprises treating said catalyst with a mixture of a reducing agent and a chelating agent and intimately contacting said catalyst in an aqueous reaction medium maintained at a pH of from 4 to 10 with a mixture of anionic and cationic exchange resins, said mixture comprising from 2% to 85% by weight of the anionic ion exchange resin with the balance essentially the cationic ion exchange resin.

2. The process as defined in claim 1, in which the anionic ion exchange resin is a quaternary ammonium salt of a styrene-divinylbenzene copolymer and the cationic ion exchange resin is a sulfonated styrene-divinylbenzene copolymer.

3. A process for removing metallic contaminants selected from the group consisting of iron, nickel and vanadium cations formed on a silica-alumina cracking catalyst during a catalytic hydrocarbon cracking process, which comprises the steps of:
   (a) separating at least a portion of the metals-contaminated cracking catalyst from said process;
   (b) treating the separated catalyst portion with a mixture of from 5% to 95% by weight of a reducing agent and correspondingly from 95% to 5% by weight of a chelating agent;
   (c) separating said catalyst portion from said mixture and washing said portion; and
   (d) intimately contacting said catalyst portion with a mixture of from 5 to 70% by weight of an anionic ion exchange resin and correspondingly from 95 to 30% by weight of a cationic ion exchange resin, in an aqueous reaction medium maintained at a pH of from 4 to 7 and at a temperature of from 0° to 100 C. under a pressure of up to 5 atmospheres, to remove the metallic contaminants from said catalyst portion.

4. The process as defined in claim 3, including the further steps of:
   (e) separating said catalyst portion from said mixture of anionic and cationic ion exchange resins,
   (f) washing the catalyst portion and,
   (g) recycling the decontaminated catalyst portion to said hydrocarbon cracking process.

5. The process as defined in claim 3, in which said reducing agent is sodium hydrosulfite and said chelating agent is selected from the group consisting of ethylenediaminetetraacetic acid and sodium tripolyphosphate.

6. The process as defined in claim 3, in which the anionic ion exchange resin is a quaternary ammonium salt of a styrene-divinylbenzene copolymer and said cationic ion exchange resin is a sulfonated styrene-divinylbenzene copolymer.

References Cited by the Examiner

UNITED STATES PATENTS 3,122,511    2/64    Foster _____ 252—415

FOREIGN PATENTS 880,622    10/61    Great Britain.

OTHER REFERENCES

Osborn: "Synthetic Ion-Exchangers," Chapman and Hall Ltd., London (1961), page 47. QD 561N3.

Partington: "A Textbook of Inorganic Chemistry," MacMillan and Co. Ltd., London, 1950, pages 490–491.

Sundkvist: "Ion Exchange Isoformation of Spectrochemcial Analysis With the Tape Method," Acta Chemica Scandinavica, 15 (1961), pp. 1485–1506, QD 1A32.

MAURICE A. BRINDISI, *Primary Examiner.*